US011858506B2

(12) United States Patent
Etesami (10) Patent No.: US 11,858,506 B2
(45) Date of Patent: Jan. 2, 2024

(54) ADAPTATION OF THE TRAJECTORY OF AN EGO VEHICLE TO MOVING EXTRANEOUS OBJECTS

(71) Applicant: Robert Bosch GmbH, Stuttgart (DE)

(72) Inventor: Seyed Jalal Etesami, Lausanne (CH)

(73) Assignee: ROBERT BOSCH GMBH, Stuttgart (DE)

(*) Notice: Subject to any disclaimer, the term of this patent is extended or adjusted under 35 U.S.C. 154(b) by 484 days.

(21) Appl. No.: 15/734,415

(22) PCT Filed: May 22, 2019

(86) PCT No.: PCT/EP2019/063232
§ 371 (c)(1),
(2) Date: Dec. 2, 2020

(87) PCT Pub. No.: WO2020/001867
PCT Pub. Date: Jan. 2, 2020

(65) Prior Publication Data
US 2021/0171061 A1    Jun. 10, 2021

(30) Foreign Application Priority Data
Jun. 25, 2018  (DE) .......................... 102018210280.5

(51) Int. Cl.
*B60W 30/095* (2012.01)
*B60W 60/00* (2020.01)
(Continued)

(52) U.S. Cl.
CPC .... *B60W 30/0956* (2013.01); *B60W 60/0011* (2020.02); *G06F 18/2415* (2023.01);
(Continued)

(58) Field of Classification Search
CPC ......... B60W 30/0956; B60W 60/0011; B60W 2554/4049; B60W 2556/20
See application file for complete search history.

(56) References Cited

U.S. PATENT DOCUMENTS

| 2010/0228419 A1 | 9/2010 | Lee et al. |
| 2011/0235864 A1 | 9/2011 | Shimizu |

(Continued)

FOREIGN PATENT DOCUMENTS

| CN | 1656524 A | 8/2005 |
| CN | 104802796 A | 7/2015 |

(Continued)

OTHER PUBLICATIONS

International Search Report for PCT/EP2019/063232, dated Sep. 9, 2019.

*Primary Examiner* — Anshul Sood
(74) *Attorney, Agent, or Firm* — NORTON ROSE FULBRIGHT US LLP; Gerard A. Messina (57) ABSTRACT

A method for predicting the trajectories of extraneous objects in the surroundings of an ego vehicle, and for determining a separate future trajectory adapted thereto for the ego vehicle. The method includes identifying the extraneous objects are identified. It is ascertained toward which proximate destination the movement of each of the extraneous objects is headed and according to which basic rules this movement occurs. It is ascertained toward which proximate destination the movement of the ego vehicle is headed and according to which basic rules this movement occurs. One quality function each is established for the ego vehicle and the extraneous objects. One quality measure each is established for the ego vehicle as well as for the extraneous objects. Those optimal movement strategies of the ego vehicle and of the extraneous objects that maximize the
(Continued)

quality measure are ascertained. The sought trajectories are ascertained from the optimal movement strategies.

13 Claims, 4 Drawing Sheets

(51) Int. Cl.
    *G06F 18/2415*     (2023.01)
    *G06V 20/58*     (2022.01)
    *G06V 20/56*     (2022.01)

(52) U.S. Cl.
    CPC .............. *G06V 20/56* (2022.01); *G06V 20/58* (2022.01); *B60W 2554/4049* (2020.02)

(56) References Cited

U.S. PATENT DOCUMENTS

| | | |
|---|---|---|
| 2013/0179382 A1 | 7/2013 | Fritsch et al. |
| 2017/0228662 A1* | 8/2017 | Gu .......................... G06N 3/042 |
| 2018/0032082 A1 | 2/2018 | Shalev-Shwartz et al. |
| 2019/0101917 A1* | 4/2019 | Yao ....................... G05D 1/0246 |
| 2020/0189574 A1* | 6/2020 | Vignard ................. G08G 1/166 |
| 2020/0331491 A1* | 10/2020 | Wray ................. B60W 60/0011 |

FOREIGN PATENT DOCUMENTS

| | | |
|---|---|---|
| DE | 102008062916 A1 | 6/2010 |
| DE | 102015221626 A1 | 5/2017 |
| WO | 2017120336 A2 | 7/2017 |
| WO | 2017197170 A1 | 11/2017 |

* cited by examiner

Fig. 4

ADAPTATION OF THE TRAJECTORY OF AN EGO VEHICLE TO MOVING EXTRANEOUS OBJECTS

FIELD

The present invention relates to trajectory planning for an at least semi-automated vehicle, in particular, in mixed traffic that includes human-controlled extraneous objects.

BACKGROUND INFORMATION

Vehicles that move in road traffic in at least a semi-automated manner will not suddenly replace the vehicles controlled by humans nor be isolated from human-controlled traffic on separate routes. Instead, these vehicles will have to safely move in mixed traffic that includes human-controlled extraneous objects, these extraneous objects also including, for example, pedestrians as weaker road users. With human-controlled extraneous objects, there is always an uncertainty as to which movement actions these extraneous objects will carry out next. A control system for the at least semi-automated driving is therefore dependent on deducing the future behavior of extraneous objects at least partially from the observation of the previous behavior.

PCT Application No. WO 2017/197 170 A1 describes a control unit for a moving autonomous unit, which may be a robot or also a vehicle. The control unit initially determines a basic trajectory with which the primary destination of the autonomous unit, such as a driving destination, is pursued. The basic trajectory is then modified by a safety module to the extent that a collision with humans or other human-controlled units is avoided. For this purpose, the respective human-controlled movements are predicted.

SUMMARY

Within the scope of the present invention, an example method is provided for predicting the trajectories of extraneous objects in the surroundings of an ego vehicle, and for determining a separate future trajectory for the ego vehicle adapted thereto.

The ego vehicle is the vehicle whose trajectory is to be acted upon in order to avoid a collision with the extraneous objects. The extraneous objects may, in particular, be humans or vehicles controlled by humans, such as conventional motor vehicles or bicycles. However, uncontrollable or only partially controllable extraneous objects, such as a vehicle which rolls away after being parked on a slope, or a trailer that has broken away from its towing vehicle, may also be involved.

In accordance with an example embodiment of the present invention, the extraneous objects are initially identified. For this purpose, a time series of physical observations of the surroundings may be used such as, for example, a sequence of camera images or a sequence of events output by an event-based sensor. Alternatively or in addition, pieces of information may be used in combination, which have been received via a wireless interface of the vehicle. These pieces of information may be transmitted by the extraneous objects themselves, for example, via a vehicle-to-vehicle (V2V) interface. The pieces of information may, however, also be transmitted by an infrastructure, for example, via a vehicle-to-infrastructure (V2I) interface.

Identifying in this context means at least detecting which extraneous objects are movable independently of one another in the surroundings of the ego vehicle. In this context, to also detect which extraneous objects in particular are involved, is advantageous but not absolutely necessary.

It is ascertained toward which proximate destination the movement of each of the extraneous objects is headed and according to which basic rules this movement occurs. How this ascertainment is carried out in particular depends on which pieces of information are available. Thus, for example, it may be extrapolated from the time course of the trajectory alone that particular proximate destinations are more probable than others. The more additional information is used, the more exact the prediction of the proximate destination becomes. If, for example, it is recognized that a vehicle as an extraneous object has set a turn signal, then it is highly probable that a turn off process is planned. However, a vehicle as an extraneous object may, for example, make its instantaneous proximate destination or even a remote destination known directly via V2V communication.

The basic rules according to which the movement of the extraneous objects occurs may encompass, in particular, the rules under the road traffic regulations and may also be a function of the type of extraneous objects. Thus, for example, vehicles must use the roadway and of two roadways, the one on the right. Pedestrians on the other hand are required, for example, to walk on sidewalks and to also use crossings such as traffic lights or crosswalks, if these are present, for crossing the roadway.

It is further ascertained toward which proximate destination the movement of the ego vehicle is headed and according to which basic rules this movement occurs. The basic rules in this case may again encompass, in particular, the rules under the road traffic regulations and need not be the same in all situations. Thus, for example, the permissible maximum speed is separately delimited if the vehicle is towing a trailer or is driving with snow chains. The ascertainment of the basic rules may thus also encompass an analysis of the configuration of the ego vehicle, for example.

One quality function $R_{1-4}$ each is established for the ego vehicle as well as for the extraneous objects, which assigns a measure to an overall situation x formed from the instantaneous states of the ego vehicle and of the extraneous objects and to a possible subsequent movement action $a_{1-4}$ as to how good the action $a_{1-4}$ in the instantaneous overall situation x is for the respectively considered road user. For example, the quality function $R_{1-4}$ may, in particular, contain a measure as to what extent the movement action $a_{1-4}$ in the situation x works toward achieving the respective proximate destination and toward compliance with the rules. The numerical indices extending from 1 through 4 in this case are not to be understood as limiting with respect to the number of treatable extraneous objects, but merely illustrative, in order to be able to explain the method with reference to an example. In general, reference may also be made to quality functions $R_i$ and next movement actions $a_i$.

The term "states" encompasses in general those variables, with which the contribution of the ego vehicle, or of the extraneous objects, to the traffic situation may be characterized. The states may encompass, in particular, positions or also time derivations thereof, i.e., for example, velocities and accelerations.

For both the ego vehicle as well as for the extraneous objects, one quality measure $Q_{1-4}$ each is established which, in addition to the value $R_{1-4}(x, a_{1-4})$, also assigns to the overall situation x and to the possible next movement action $a_{1-4}$ the expected value $E(P(x'))$ of a distribution of the probabilities $P(x')$ of state changes $x'$, with which the other road users react to the next movement action $a_{1-4}$. The quality measure $Q_{1-4}$ may, for example, be a weighted sum of the value $R_{1-4}(x, a_{1-4})$ of the quality function and the expected value $E(P(x'))$.

The optimal movement strategies $\pi_{1-4}$ of the ego vehicle and of the extraneous objects that maximize the quality measure $Q_{1-4}$ are ascertained. The sought trajectories of the ego vehicle and of the extraneous objects are ascertained from the optimal movement strategies $\pi_{1-4}$.

The term movement strategy in this case encompasses in general any function $\pi_{1-4}$, which assigns a numerical value $\pi_{1-4}(x, a_{1-4})$ to an overall situation x and to a next movement action $a_{1-4}$. The term is therefore generalized compared to conventional linguistic usage in that it is associated with deterministic rules. A deterministic rule may, for example, indicate that given the presence of a particular overall situation x, exactly one next movement action $a_{1-4}$ by the ego vehicle is to be carried out or is performed by the extraneous objects.

It has been found, in particular, that the behavior of the extraneous objects does not always follow deterministic rules. If, for example, the extraneous object is controlled by a human, then the control is in fact intelligent but does not necessarily result in exactly the movement action that is optimal for tracking the respective proximate destination. This applies even when a human driver, in principle, decides in favor of the correct driving maneuver. Thus, for example, turning left from a road on which no route is explicitly marked for such purpose, may strew around the ideal driving line. So too will the vehicle during a multitude of brake applications before a red light in fact come to a stop approximately at the stop line, but the time course of the velocity may differ. The driver may, for example, initially step on the brake pedal, more heavily at times, more lightly at times, and later subconsciously adjust the brake pressure in order finally to come to a stop at the correct location. An underlying cause for this is that the driving task overall is too complex in order to be fully consciously carried out. In order to even be able to master the multitasking at the required velocity, a learning driver must initially "automate" particular processes into the subconscious.

Even the correct behavior of a pedestrian is not fully deterministic. If, for example, the pedestrian crosses the roadway, he/she will not always do this exactly at a right angle to the driving direction, but with a random deviation therefrom.

The behavior of the extraneous objects no longer follows deterministic rules, even less so if a controlling human makes the wrong decision. Thus, for example, setting the right turn signal is no guarantee that the driver will actually turn right from a priority road into the next road and yield his/her right of way to another vehicle coming from this road. Instead, the case may also occur that the driver continues to drive straight ahead once he/she has determined that he/she has erred and need not turn off to the right until one road later. Nor is a human driver able, for example, to react to an object hidden in the blind spot of his/her mirror. In addition, pedestrians continually deliberately defy the obligation to use the secured crossings or the obligation to wait at a red light.

Furthermore, even the behavior of the ego vehicle is probabilistic to a certain extent. If, for example, a particular braking pressure is applied to the brake cylinder of the braking system for stopping, the deceleration of the ego vehicle caused as a result may, for example, vary as a function of the state of the roadway as well as of temperature and water content of the brake fluid.

With the state changes of the other road users being generalized to form a probability distribution $P(x')$ and with movement strategies $\pi_{1-4}$ of all road users also being capable of being probabilistic, it is thus possible to refine the reaction of the ego vehicle to the overall situation x in such a way that it is in fact proper traffic conduct with a higher degree of probability and, in particular, that it avoids collisions. To a certain extent, anticipatory driving, which any human driver is required to learn in driving school, is thus technically simulated, so that a system for the at least semi-automated driving is able to master the driving task at least as well as a human driver.

In one particularly advantageous embodiment, quality measures $Q_{1-4}$ are selected, whose optima with respect to movement strategies $\pi_{1-4}$ are provided by the Bellman optimum. This is to a certain extent a combination of a recursive definition and mutual coupling of quality measures $Q_{1-4}$.

In the case of an infinite time horizon, for example, quality measures $Q_i$ in finished optimized end state $Q^*$ may have the form $$Q^*_i(x,a_i) = R_i(x,a_i) + \gamma \cdot E_{\pi^*(-i)}(V^*_i(x')x,a_i) \qquad (1)$$

in which $\pi^*(-i)$ are the optimal movement strategies of the other road users, whose index is a different one than i and $$V^*_i(x') = \underset{a'}{\text{softmax}}\, Q^*_i(x', a')$$

Expected value E extends across the probabilistic state transitions and the strategies of the other road users, whose index is a different one than i. It is provided by $$E = \sum_{a_{-i},x} P(x' \mid x, a) \cdot \pi^*(a_{-i} \mid x) \cdot V^*_i(x).$$

In a further particularly advantageous embodiment, optimal movement strategies $\pi_{1-4}$ are ascertained provided that given the same prehistory $H^t$, they are independent of one another:

$$\pi^*(a_{-i}(t) \mid H^t) = \prod_{j \in -i} \pi^*_j(a_j(t) \mid H^t). \qquad (2)$$

If, furthermore, a Boltzmann-Gibbs distribution is selected as the distribution of probabilities $P(x')$ of state changes x', then the road users select their movement strategies in each case according to the principle of maximum entropy:

$$\pi^*_i(a_j(t)|H^t) \propto \exp(Q^*_i(x(t),a_j(t))) \qquad (3).$$

The equations (1) through (3) form a set of M coupled equations, M being the number of road users considered. The equations may be combined to form $$Q^*_i = T_i(Q^*_{-i},Q_i), i \in [M] \qquad (4).$$

$T_i$ in this case is the right side of equation (1). Equation (4) has exactly one optimal solution $Q_i^*$, which is obtainable using the following algorithm:

| Algorithm 1 - MMCE-I |
|---|
| Input Ht, {Rj} |
| 1:           initialize: $Q_i^0$ and $Q_{-i}^0$ |
| 2:           s = 0 |
| 3:           while convergence do |
| 4:              for j ∈ -i do |
| 5:                  $Q_j^{s+1} \leftarrow T_i(Q_{-1}^{s+1}, Q_i^s)$ |
| 6:              end for |
| 7:              $Q_i^{s+1} \leftarrow T_i(Q_{-1}^{s+1}, Q_i^s)$ |
| 8:              s ← s+1 |
| 9:           end while |
| Output $Q^s$ |

If the time horizon is finite, the problem is slightly different. Quality function Q of the i-th road user in the finished optimized state at time step $\tau \in [t, t+T]$ has the form $$Q_i^\tau(x, a_i) := R_i(x, a_i) + E_{\pi_{-i}^\tau}(V_i^{\tau+1}(x') | x, a_i) \quad (5),$$

$$V_i^{\tau+1}(x') = \underset{a'}{\text{softmax}}\, Q_i^{\tau+1}(x', a')$$

with the boundary condition that $$V_i^{t+T}(x) = R_{i,F}(x)$$

is the value of quality function $R_i$ in the final optimized state at the end of the time horizon. Similar to the case of the finite time horizon, the expected value is again a function of the strategies of the other road users which, in turn are advantageously Boltzmann-distributed $$\pi_{-i}^\tau(a_j | x) \propto \prod_{j \in -i} \exp(Q_j^\tau(x, a_j)).$$

Thus, equation (5) may be written as:

$$Q_i^\tau = U_i(Q_{-i}^\tau, V_i^{\tau+1}), i \in [M] \quad (6)$$

in which $U_i$ is the right side of equation (5). An optimal approach is, for example, obtainable using the following algorithm:

| Algorithm 2 - MMCE-F |
|---|
| Input $\{R_j, R_{j,F}\}$, T |
| 1:     for j=1, ..., M do |
| 2:         $V_j^{t+T} \leftarrow R_{j,F}$ |
| 3:     end for |
| 4:     initialize: $Q^0 \leftarrow [Q_1^0, ..., Q_M^0]$ |
| 5:     for κ=T-1, ..., 0 do |
| 6:         s=0 |
| 7:         while convergence do |
| 8:             for i=1, ..., M do |
| 9:                  $Q_i^{s+1} \leftarrow U_i(Q_{-i}^s, V_i^{t+\kappa+1})$ |
| 10:             end for |
| 11:             s ← s+1 |
| 12:        end while |
| 13:        $Q^0 \leftarrow Q^s$ |
| 14:        for j=1, ..., M do |
| 15:             $V_j^{t+\kappa} \leftarrow \text{softmax}_{a_j}\, U_j(Q_{-j}^0, V_j^{t+\kappa+1})$ |
| 16:        end for |
| 17:     end for |
| Output $\{V^t, ..., V^{t+T}\}$ |

Within the scope of the present invention, a further method is provided for predicting the trajectories of extraneous objects in the surroundings of an ego vehicle and for determining a separate future trajectory for the ego vehicle adapted thereto. In accordance with an example embodiment of the present invention, this method begins initially like the above-described method, i.e., the extraneous objects are identified, and the proximate destinations and the basic rules of the movement for both the ego vehicle as well as the extraneous objects are ascertained.

In contrast to the above-described method, one feature function $F_{1-4}$ each is established for both the ego vehicle as well as for the extraneous objects in such a way that the application of $F_{1-4}$ to a set $\theta_{1-4}$ of parameters still free provides a quality function $R_{1-4}$, this quality function $R_{1-4}$ assigning a measure to an overall situation x formed from the instantaneous states of the ego vehicle and from a possible next movement action $a_{1-4}$, as to how good action $a_{1-4}$ is in instantaneous overall situation x for the respectively considered road user. Quality function $R_{1-4}$ may include, in particular, a measure as to what extent movement action $a_{1-4}$ in situation x works toward achieving the respective proximate destination and toward compliance with the rules.

Feature function $F_{1-4}$ may, for example, embody properties and destinations of the respective road user such as, for example, the target destination toward which a pedestrian is moving, or also his/her walking speed. In the case of a vehicle, the requirement, for example, that the drive is to proceed safely, smoothly and comfortably, in addition to the target destination, may be incorporated into feature function $F_{1-4}$. Thus, feature function $F_{1-4}$ may, in particular, be composed of multiple parts, for example, which relate to different destinations, these destinations may be opposite to one another. Set $\theta_{1-4}$ of parameters may then, for example, embody the weights with which different destinations and requirements are included in ultimate quality function $R_{1-4}$. Set $\theta_{1-4}$ of parameters may, in particular, be present as vectors of parameters, for example, and may include coefficients, for example, with which a linear combination of different destinations contained in feature function $F_{1-4}$ are incorporated into quality function $R_{1-4}$.

Movement strategies $\pi_{1-4}$ of the ego vehicle and of the extraneous objects are ascertained as the strategies that result in a maximal causal entropy $H(a_{1-4}\|x)$ of movement actions $a_{1-4}$ of the ego vehicle and of the extraneous object in overall situation x. The trajectories searched are ascertained from movement strategies $\pi_{1-4}$.

The ultimately obtained result yields the same advantages as the result obtained according to the above-described method. The advantage of this method in particular, is that even less information about the respective road users is required for determining parameter set $\theta_{1-4}$ than for the direct determination of quality function $R_{1-4}$. Each piece of additional information, regardless of its source, may on the other hand be taken into consideration in parameter set $\theta_{1-4}$. Free parameters $\theta_{1-4}$ are determined during the optimization as a function of movement strategies $\pi_{1-4}$.

The causal entropy $H(a_{1-4}\|x)$ may be written as $$H(a_{1-4} | | x) = -E_{a,x}\left[\sum_{t \leq T} \log \pi^t(a(t) | H^t)\right].$$

The maximum of causal entropy $H(a_{1-4}\|x)$ is advantageously ascertained with respect to movement strategies $\pi_{1-4}$ under the boundary condition that the expected value of respective feature function $F_{1-4}$ across all possible overall situations x and all possible next movement actions $a_{1-4}$ is the same for both the ego vehicle as well as for the extraneous objects as the mean value of the feature functions $F_{1-4}$ empirically observed in the previous trajectories. This mean value may be formed, in particular, across all previously empirically observed situations x and movements $a_{1-4}$:

$$E_{a_i,x}[F_i(x, a_i)] = \tilde{E}_{a_i,x}[F_i(x, a_i)] \forall \ i, \quad (7)$$

$$\pi_i^t(a_i(t) \mid H^t) \geq 0 \forall \ i, a_i(t), H^t,$$

$$\sum_{a_i(t)} \pi_i^t(a_i(t) \mid H^t) = 1 \forall \ i, H^t.$$

In connection with the further boundary conditions that, at the same prehistory $H^t$, optimal movement strategies $\pi_{1-4}$ are independent of one another and that they are each distributed statistically around a strategy that maximizes respective quality function $R_{1-4}$, it is possible to specify a recursive solution for equation (7) using $$E_{a_i,x}[F_i(x, a_i)] = \sum_{t \leq T} E[F_i(x(t), a_i(t))]:$$

$$\pi_i^t = \frac{1}{Z_i(\tau)} \exp(W_i^\tau(H^\tau, a_i(\tau)),$$

$$W_i^\tau(H^\tau, a_i(\tau)) = \theta_i^T F_i(x(\tau), a_i(\tau)) + E_{\pi^\tau(-i)}[\log Z_i(\tau+1)],$$

$$\log Z_i(\tau) = \operatorname*{softmax}_{a'} W_i^\tau(H^\tau, a'),$$

$$\log Z_i(T) = \operatorname*{softmax}_{a} \theta_i^T F_i(x(T), a).$$

The boundary condition is $Z_i(T+1)=1$ for all road users.

The recursive approach is similar to fully optimized quality measure Q according to equation (5). $W_i^\tau(H^\tau, a_i(\tau))$ plays the role of quality measure $Q_i$ and quality functions $R_i$ as a linear combination are composed of feature functions $F_i$.

Thus, from the perspective of the ego vehicle, an "inverse reinforcement learning" may ultimately be operated, i.e., with knowledge of quality function $R_1$ of the ego vehicle, it is possible based solely on the observation of the other road users to deduce their quality functions $R_{2-4}$. This may occur, for example, using the following algorithm:

---
Algorithm 3: MMCE-IRL for the ego vehicle
---
1:      for j ∈ -i do
2:      $\tilde{F}_j^{(t)} \leftarrow \sum_{(x, a_j) \in H^t} F_j(x, a_j))$
3:      $R_j^{(t)} \leftarrow F_j^T \theta_j$
4:      end for
5:      $\Pi \leftarrow$ MMCE ($H^t$, $\{R_k^{(t)}: k \in -i\}$, $R_i$)
6:      for j ∈ -i do
7:      $\bar{F}_j \leftarrow E_\pi[F_j]$
8:      $\theta_j \leftarrow$ Projection$_{\|\theta_j\| \leq B} (\theta_j - \alpha(\tilde{F}_j(t) - \bar{F}_j))$
9:      end for
---

In a further particularly advantageous embodiment, the extraneous objects are each classified with respect to their type, and respective quality function $R_{2-4}$ or respective feature function $F_{2-4}$ is selected on the basis of this type. In this way, the ascertainment of the ultimate trajectories of the extraneous objects, and thus also of the trajectory of the ego vehicle adapted thereto, may converge more rapidly and arrive at a more exact result. As explained above, the basic rules of the movement may, in particular, be a function of the type of the object. The classification may be carried out based on the physical observations and/or based on the pieces of information received via the wireless interface.

As explained above, the ascertainment of the trajectory of the ego vehicle adapted to the presence of moving extraneous objects is not an end in itself, but is aimed at improving the fitness of vehicles driving in at least a semi-automated manner specifically for mixed traffic that includes extraneous objects controlled by humans. The present invention therefore also relates to a method for controlling an ego vehicle in a traffic situation including moving extraneous objects in the surroundings of the ego vehicle.

In accordance with an example embodiment of the present invention, in this method, the trajectory of the ego vehicle adapted to the behavior of the extraneous objects is ascertained using one of the above-described methods. The adapted trajectory is conveyed to a movement planner of the ego vehicle. With the aid of the movement planner, an activation program for a drive system, a steering system and/or a braking system of the ego vehicle is ascertained, the activation program being designed to correlate as best as possible the actual behavior of the vehicle within the scope of the system limits with the ascertained trajectory.

The drive system, steering system and/or braking system is/are activated according to the activation program.

The method may be implemented in an arbitrary control unit already present in the ego vehicle, since access to the pieces of information about extraneous objects in the vehicle surroundings detected with a sensor system or obtained via the wireless interface typically exists from any location in the vehicle due to the internal networking with the aid of the CAN bus. The movement planner may also be activated via the CAN bus from any location in the vehicle. The method may, for example, be implemented in the form of a software, which may be sold as an update or upgrade for such a control unit and, to that extent, represents a separate product. The present invention therefore also relates to a computer program including machine-readable instructions which, when they are executed on a computer and/or on a control unit, prompt the computer and/or the control unit to carry out a method provided by the present invention. The present invention also relates to a machine-readable data medium or a download product including the computer program.

BRIEF DESCRIPTION OF THE DRAWINGS

Further measures improving the present invention are illustrated in detail below together with the description of the preferred exemplary embodiments of the present invention with reference to figures.

DETAILED DESCRIPTION OF EXAMPLE EMBODIMENTS

Figure 1:
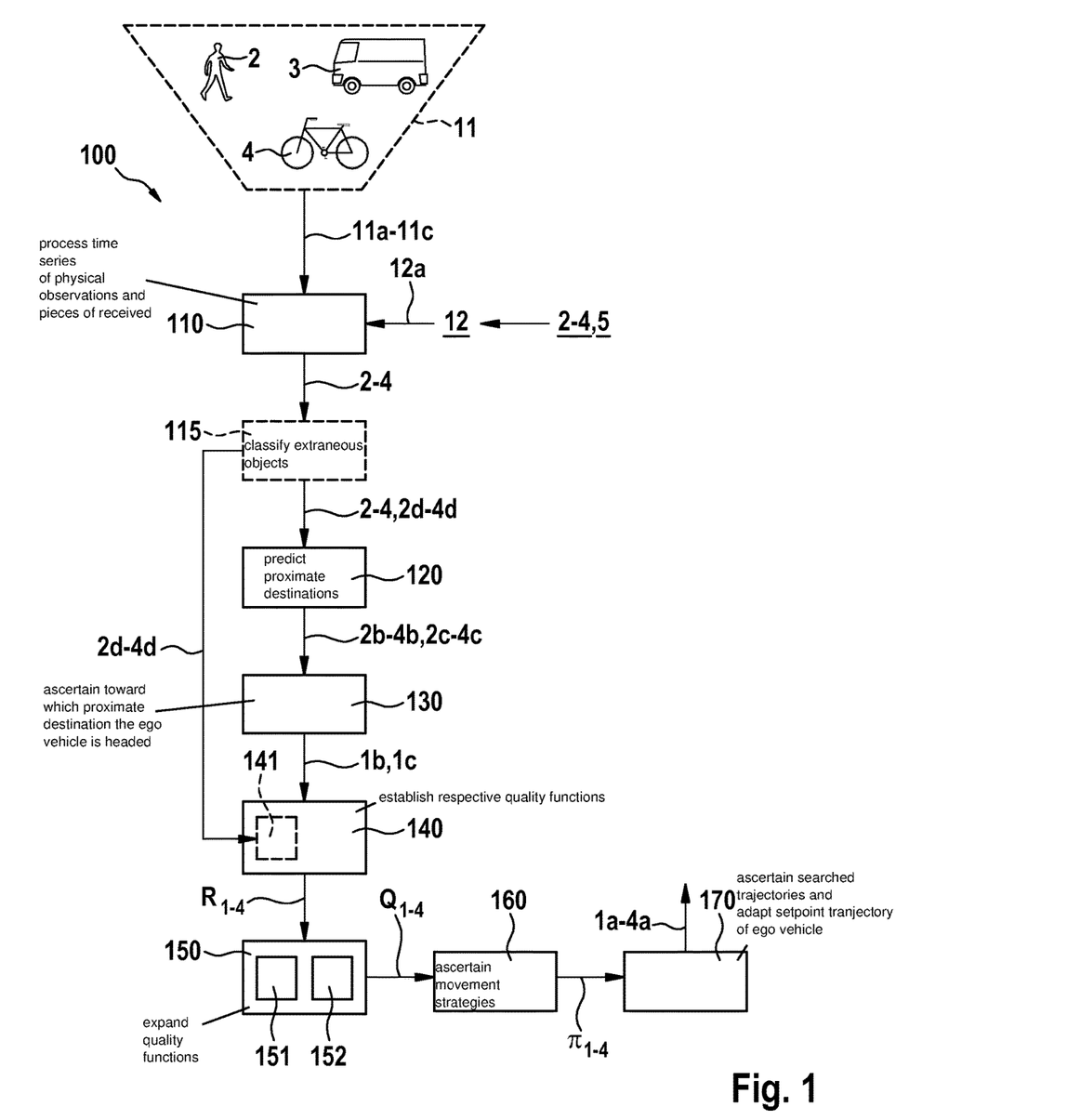
FIG. 1 shows an exemplary embodiment of method 100.

FIG. 1 shows one exemplary embodiment of method 100. In step 110, a time series 11a through 11c of physical observations of surroundings 11 of ego vehicle not delineated in FIG. 1, together with pieces of information 12a that have been received via wireless interface 12, are processed. These pieces of information 12a originate from extraneous objects 2 through 4 in vehicle surroundings 11 itself, and/or from an infrastructure 5. In step 110, extraneous objects 2 through 4 are identified, i.e., it is established that three extraneous objects 2 through 4 are present, which move in different ways.

Extraneous objects 2 through 4 are classified in optional step 115 according to types $2d$ through $4d$. In step 120, each of proximate destinations $2b$ through $4b$ tracked by extraneous objects 2 through 4 is predicted and the basic rules $2c$ through $4c$ are ascertained, according to which the movement of extraneous objects 2 through 4 occurs. Similarly, it is ascertained in step 130 toward which proximate destination $1b$ the movement of ego vehicle 1 is headed and according to which basic rules $1c$ this movement occurs.

In step 140, respective quality function $R_{1-4}$ is established for ego vehicle 1 as well as for extraneous objects 2 through 4 on the basis of the existing pieces of information, the respective type $2d$ through $4d$ of extraneous object 2 through 4 capable of being used according to optional substep 141, if this type has been determined in optional step 115.

In step 150, quality functions $R_{1-4}$ are expanded to include quality measures $Q_{1-4}$, which also include expected value $E(P(x'))$ of a distribution of probabilities $P(x')$ of state changes $x'$, and to that extent, also couples quality measures $Q_{1-4}$ among one another. In this case, quality measures $Q_{1-4}$ are selected according to substep 151, whose optima with respect to movement strategies $\pi_{1-4}$ are provided by the Bellman optimum. According to substep 152, a Boltzmann-Gibbs distribution is selected as the distribution of probabilities $P(x')$ of state changes $x'$.

In step 160, those movement strategies $\pi_{1-4}$ of the ego vehicle and of extraneous objects 2 through 4 are ascertained, which maximize quality measures $Q_{1-4}$. Ascertained from this in step 170 are finally the searched trajectories $2a$ through $4a$ of extraneous objects 2 through 4 as well as setpoint trajectory $1a$ of ego vehicle 1 adapted thereto.

Figure 2:
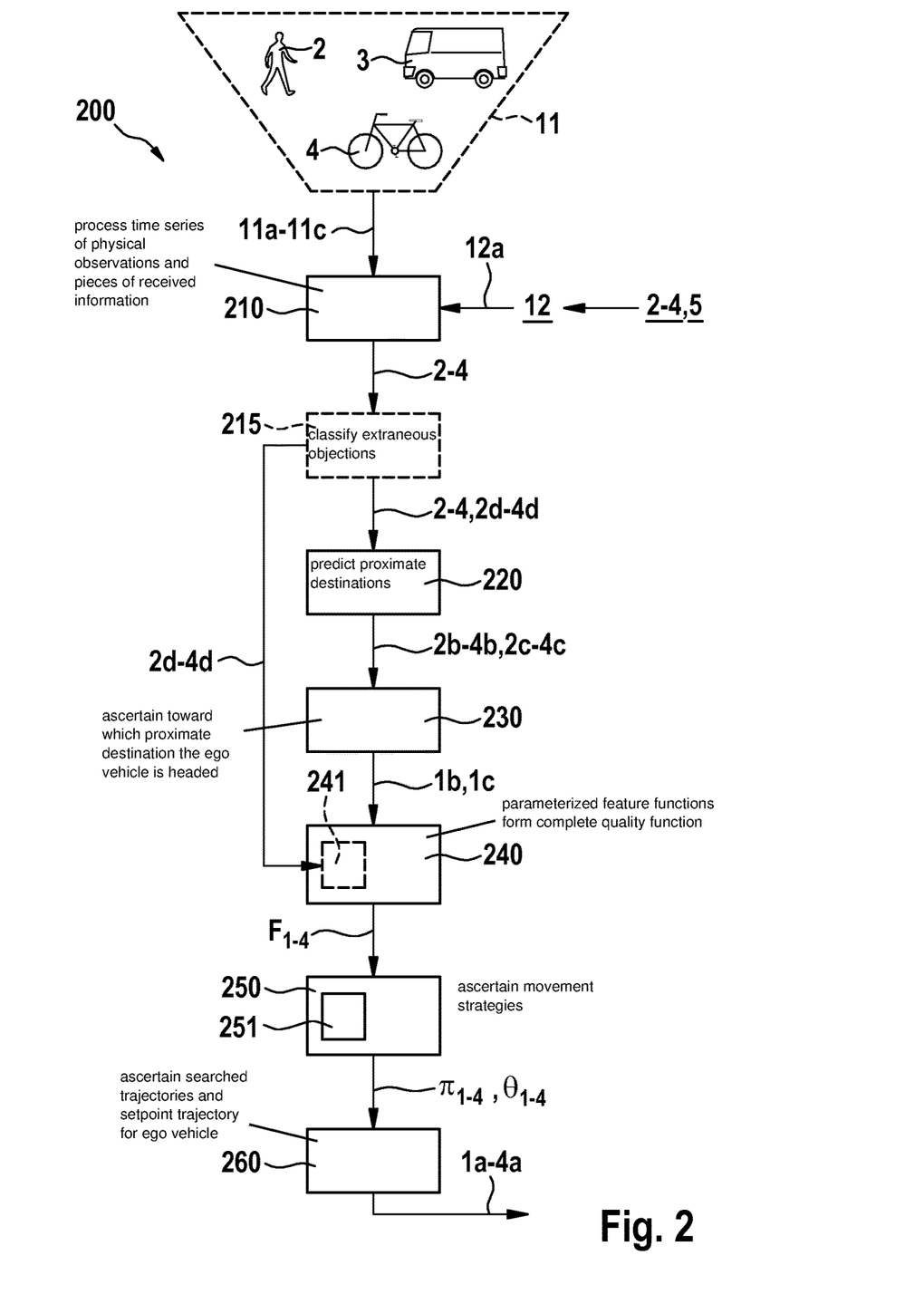
FIG. 2 shows an exemplary embodiment of method 200.

FIG. 2 shows one exemplary embodiment of method 200. Steps 210, 215, 220 and 230 are identical to steps 110, 115, 120 and 130 of method 100.

In contrast to step 140, no complete quality function $R_{1-4}$ is determined in step 240 of method 200, rather feature functions $F_{1-4}$, which are parameterized with a set $\theta_{1-4}$ of parameters still free and only in connection with these parameters $\theta_{1-4}$ form complete quality functions $R_{1-4}$. Types $2d$ through $4d$ of extraneous objects 2 through 4, provided they have been determined in step 215, may be used in optional substep 241 for selecting respective feature functions $F_{2-4}$.

In step 250, movement strategies $\pi_{1-4}$ of the ego vehicle and of the extraneous objects are ascertained as those strategies that maximize the maximal causal entropy. At the same time, parameters $\theta_{1-4}$ of feature functions $F_{1-4}$ are also determined. In this case, a boundary condition is predefined according to substep 251, which enables a recursive determination of movement strategies $\pi_{1-4}$.

In step 260, similar to step 170 of method 100, searched trajectories $2a$ through $4a$ of extraneous objects 2 through 4 as well as setpoint trajectory $1a$ of ego vehicle 1 are ascertained from movement strategies $\pi_{1-4}$.

Figure 3:
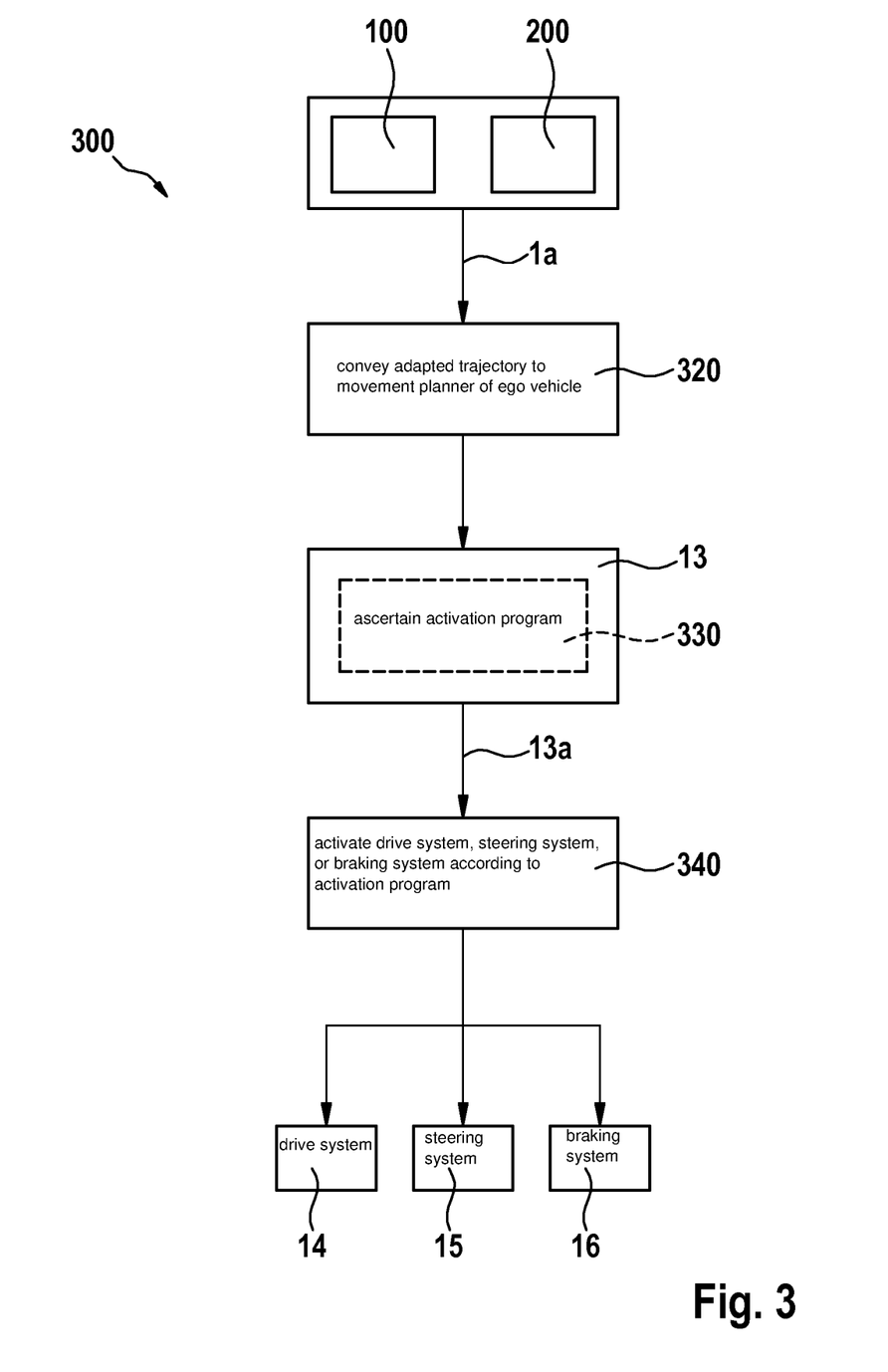
FIG. 3 shows an exemplary embodiment of method 300.

FIG. 3 shows one exemplary embodiment of method 300. In step 310, setpoint trajectory $1a$ for ego vehicle 1 adapted to the behavior of extraneous objects 2 through 4 in surroundings 11 of ego vehicle 1 is ascertained using method 100 or 200. This adapted trajectory $1a$ is conveyed in step 320 to movement planner 13 of ego vehicle 1. In step 330, an activation program $13a$ for a drive system 24, a steering system 15 and/or a braking system 16 of ego vehicle 1 is ascertained with the aid of movement planner 13.

In this context, the term trajectory in general relates to a path in combined space and time coordinates. This means that a trajectory may be changed not only by a change of the movement direction, but also by a change of velocity such as, for example, a deceleration, waiting, and a subsequent restarting.

In step 340, drive system 14, steering system 15 or braking system 16 is activated according to activation program $13a$.

Figure 4:
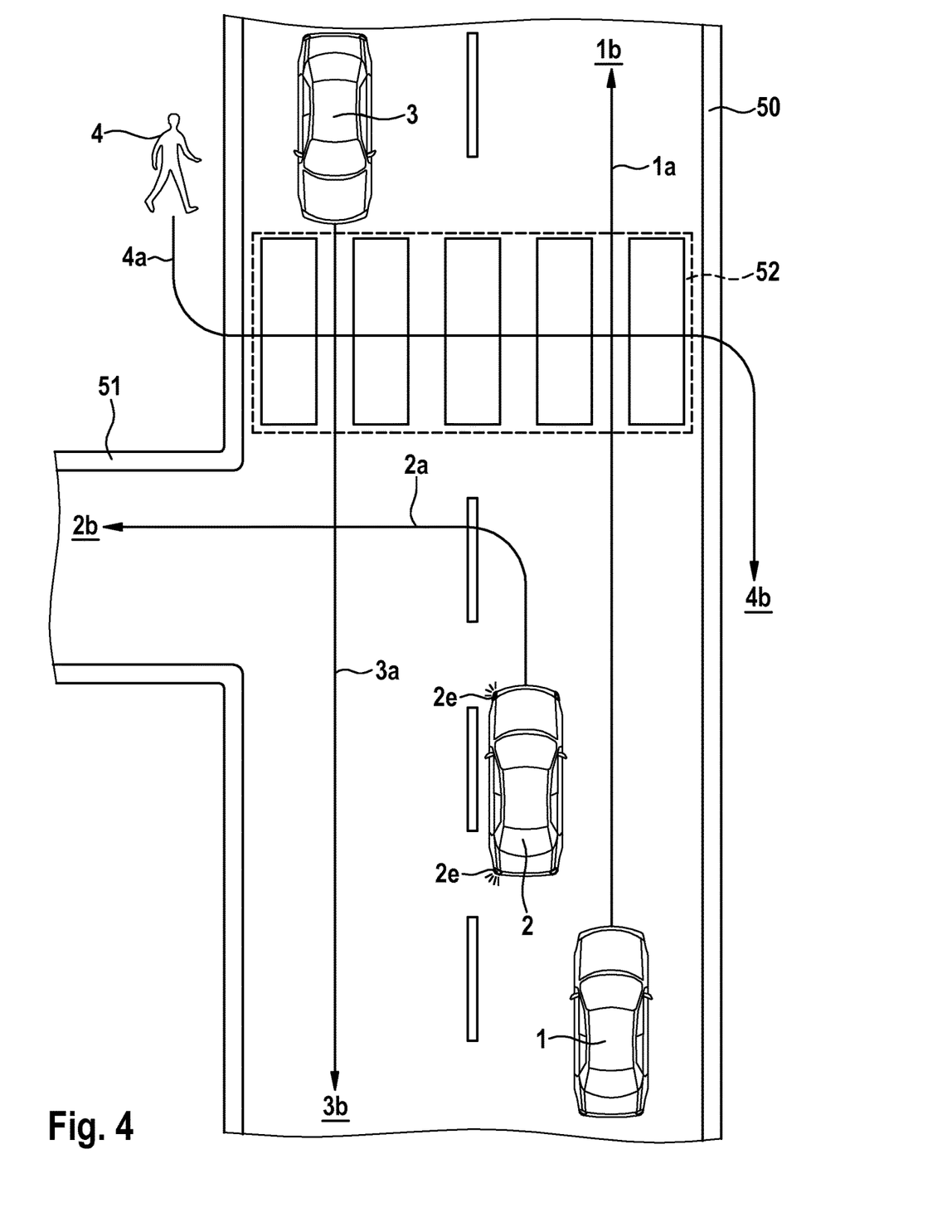
FIG. 4 shows an exemplary traffic scene including ego vehicle 1 and three human-controlled extraneous objects 2 through 4.

FIG. 4 shows a complex traffic scene, in which described methods 100, 200, 300 may be advantageously used. Ego vehicle 1 is driving straight ahead on the right-hand traffic lane of a road 50 in the direction of proximate destination $1b$.

First extraneous object 2 is a further vehicle, whose turn signal $2e$ indicates that its driver intends to turn into side road 51 leading to proximate destination $2b$ of vehicle 2. Second extraneous object 3 is a further vehicle which, from the perspective of ego vehicle 1, is en route in the direction of its proximate destination $3b$ on the oncoming lane of road 50. Third extraneous object 4 is a pedestrian who, from his/her perspective, is heading toward an proximate destination on the opposite side of road 50.

In the situation depicted in FIG. 4, pedestrian 4 must use crossing 52 across road 50, which also obligates the driver of vehicle 3 to wait. Thus, the driver of vehicle 2 may, in principle, immediately accelerate and turn left as intended, which would be optimal for him/her to quickly reach proximate destination $2b$. Accordingly, ego vehicle 1 would have clear sailing in his/her lane at least up to crossing 52. A control method under the simplifying assumption that the driver of vehicle 2 will do the optimum for him/herself, would thus accelerate ego vehicle 1. If, however, the driver of vehicle 2 erroneously assesses the situation to the effect that he/she must first allow vehicle 3 in the oncoming traffic to pass (which would also be correct of course without pedestrian 4 on crossing 52), the ego vehicle then collides with vehicle 2 from behind. The example methods according to the present invention make it possible to take such uncertainties into consideration. Thus, for example, the velocity for the continuation of travel may be limited to such an extent that in the event vehicle 2 actually stops, a collision even with a full brake application may be avoided.

What is claimed is:

1. A method for predicting trajectories of extraneous objects in surroundings of an ego vehicle, and for determining a separate future trajectory for the ego vehicle adapted to the predicted trajectories, comprising the following steps:
   identifying the extraneous objects from a time series of physical observations of the surroundings and/or from pieces of information received from the extraneous objects themselves and/or from an infrastructure via a wireless interface of the vehicle;
   ascertaining toward which respective destination a movement of each of the extraneous objects is headed and according to which basic rules the movement of each of the extraneous objects occurs;
   ascertaining toward which destination a movement of the ego vehicle is headed and according to which basic rules the movement of the ego vehicle occurs;
   establishing a respective quality function for the ego vehicle and for each of the extraneous objects, which assigns a measure to an overall situation formed from instantaneous states of the ego vehicle and of the extraneous objects and to a respective possible next movement action as to how good the next action in the instantaneous overall situation is for each of the ego vehicle and each of the extraneous objects;

establishing a respective quality measure for the ego vehicle and for each of the extraneous objects which also assigns to the overall situation and to the possible next movement action an expected value of a distribution of probabilities of state changes, with which other road users react to the next movement action;

ascertaining optimal movement strategies of the ego vehicle and of the extraneous objects that maximize the respective quality measures;

ascertaining the predicted trajectories and the future trajectory from the optimal movement strategies;

adapting a trajectory of the ego vehicle adapted to the predicted trajectories of the extraneous objects;

conveying the adapted trajectory to a movement planner of the ego vehicle;

ascertaining an activation program for a drive system of the ego vehicle, and/or a steering system of the ego vehicle, and/or a braking system of the ego vehicle, using the movement planner; and activating the drive system, and/or the steering system, and/or the braking system, according to the activation program.

2. The method as recited in claim 1, wherein the quality measures are selected whose optima with respect to the movement strategies are provided by a Bellman optimum.

3. The method as recited in claim 1, wherein a Boltzmann-Gibbs distribution is selected as the distribution of the probabilities of state changes.

4. The method as recited in claim 1, wherein the optimal movement strategies are ascertained under a boundary condition that at a same prehistory, the optimal movement strategies are independent of one another.

5. The method as recited in claim 1, wherein the optimal movement strategies are ascertained under a boundary condition that the optimal movement strategies are each distributed around a strategy that maximizes the respective quality function.

6. The methods as recited in claim 1, wherein the extraneous objects are each classified with respect to its respective type, and the respective quality function is selected based on the respective type.

7. The method as recited in claim 1, wherein the activation program is configured to correlate as best as possible an actual behavior of the ego vehicle with the adapted trajectory within the scope of system limits.

8. A method for predicting the trajectories of extraneous objects in surroundings of an ego vehicle, and for determining a separate future trajectory for the ego vehicle adapted to the predicted trajectories, comprising the following steps:

identifying the extraneous objects from a time series of physical observations of the surroundings and/or from pieces of information received from the extraneous objects themselves and/or from an infrastructure via a wireless interface of the vehicle;

ascertaining toward which respective destination a movement of each of the extraneous objects is headed and according to which basic rules the movement of the extraneous objects occurs;

ascertaining toward which destination a movement of the ego vehicle is headed and according to which basic rules the movement of the ego vehicle occurs;

establishing a respective feature function for the ego vehicle and for each of the extraneous objects in such a way that an application of respective feature functions to a set of parameters still free provides a quality function, the quality function assigning a measure to an overall situation formed from instantaneous states of the ego vehicle and the extraneous objects and to a possible next movement action as to how good the next action in the instantaneous overall situation is for the for each of the ego vehicle and each of the extraneous objects;

ascertaining movement strategies of the ego vehicle and of the extraneous objects as those strategies which result in a maximal causal entropy of the movement actions of the ego vehicle and of the extraneous objects in the overall situation;

ascertaining the predicted trajectories and the future trajectory from the movement strategies;

adapting a trajectory of the ego vehicle adapted to the predicted trajectories of the extraneous objects;

conveying the adapted trajectory to a movement planner of the ego vehicle;

ascertaining an activation program for a drive system of the ego vehicle, and/or a steering system of the ego vehicle, and/or a braking system of the ego vehicle, using the movement planner; and activating the drive system, and/or the steering system, and/or the braking system, according to the activation program.

9. The method as recited in claim 8, wherein a maximum of the causal entropy with respect to the movement strategies is ascertained under a boundary condition that for both the ego vehicle as well as for the extraneous objects, an expected value of the respective feature function across all possible overall situations and all possible next movement actions is equal to a mean value of the feature functions empirically observed in previous trajectories.

10. The method as recited in claim 8, wherein the extraneous objects are each classified with respect to its respective type, and the respective feature function is selected on based on the respective type.

11. The method as recited in claim 8, wherein the activation program is configured to correlate as best as possible an actual behavior of the ego vehicle with the adapted trajectory within the scope of system limits.

12. A non-transitory machine-readable storage medium on which are stored instructions for predicting trajectories of extraneous objects in surroundings of an ego vehicle, and for determining a separate future trajectory for the ego vehicle adapted to the predicted trajectories, the instructions, when executed by a computer and/or control unit, causing the computer and/or control unit to perform the following steps:

identifying the extraneous objects from a time series of physical observations of the surroundings and/or from pieces of information received from the extraneous objects themselves and/or from an infrastructure via a wireless interface of the vehicle;

ascertaining toward which respective destination a movement of each of the extraneous objects is headed and according to which basic rules the movement of each of the extraneous objects occurs;

ascertaining toward which destination a movement of the ego vehicle is headed and according to which basic rules the movement of the ego vehicle occurs;

establishing a respective quality function for the ego vehicle and for each of the extraneous objects, which assigns a measure to an overall situation formed from instantaneous states of the ego vehicle and of the extraneous objects and to a respective possible next movement action as to how good the next action in the instantaneous overall situation is for each of the ego vehicle and each of the extraneous objects;

establishing a respective quality measure for the ego vehicle and for each of the extraneous objects which also assigns to the overall situation and to the possible next movement action an expected value of a distribution of probabilities of state changes, with which other road users react to the next movement action;

ascertaining optimal movement strategies of the ego vehicle and of the extraneous objects that maximize the respective quality measures;

ascertaining the predicted trajectories and the future trajectory from the optimal movement strategies;

adapting a trajectory of the ego vehicle adapted to the predicted trajectories of the extraneous objects;

conveying the adapted trajectory to a movement planner of the ego vehicle;

ascertaining an activation program for a drive system of the ego vehicle, and/or a steering system of the ego vehicle, and/or a braking system of the ego vehicle, using the movement planner; and activating the drive system, and/or the steering system, and/or the braking system, according to the activation program.

13. The non-transitory machine-readable storage medium as recited in claim 12, wherein the activation program is configured to correlate as best as possible an actual behavior of the ego vehicle with the adapted trajectory within the scope of system limits.

* * * * *